*INVENTOR*
PAUL W. NOECKER
BY E. Janet Berry
*ATTORNEY*

Jan. 28, 1964 P. W. NOECKER 3,119,410
HIGH PRESSURE VALVE

Filed April 27, 1961 2 Sheets-Sheet 2

INVENTOR
PAUL W. NOECKER

BY *E. Janet Berry*
ATTORNEY

United States Patent Office 3,119,410
Patented Jan. 28, 1964

3,119,410
HIGH PRESSURE VALVE
Paul W. Noecker, Tuscola, Ill., assignor to National Distillers and Chemical Corporation, New York, N.Y., a corporation of Virginia
Filed Apr. 27, 1961, Ser. No. 110,600
7 Claims. (Cl. 137—512)

This invention relates to valves and more particularly to a high pressure valve especially suitable for use in connection with compressors, or the like, where pressures on the order of 30,000 p.s.i. to 50,000 p.s.i., and higher, are required.

In compressors of the character with which we presently are concerned, and high pressure ethylene gas compressors in particular, modified operating proceedures have placed excessive structural demands upon the compressor. This is particularly true where modification of cylinder head structure has been undertaken with excessive stress concentrations developing in the locale of the intake or suction valve. In an effort to compensate for such stress concentrations, reduction in size of the valve ports has been undertaken with a view to reducing the stress values induced during the compression stroke, or, in the case of ethylene gas compressors, the compression of the gas.

In the prior art, in compressors of this character, where poppet valves are employed, such valves have relative short life and fail by reason of fatigue as well as through excessive wear and breakage of the poppet, valve seat, and valve cage.

The novel valve of the present invention has been especially designed to eliminate deficiencies of this character and not only has the property of superimposed stresses to offset the cyclic stresses induced in the valve by compressing, but also that of a short valve plate lift together with a better distribution of the plate mass, thus minimizing wear on the valve seat.

Accordingly, it is a major purpose of the present invention to provide a novel valve of the class set forth which may be used effectively in any reciprocating gas compressor wherein discharge pressures on the order of 50,000 p.s.i., or higher, are encountered.

It is a further object of the invention to provide a novel valve where all stress risers are eliminated and the valve body stresses can be superimposed above that encountered by gas compressing.

It is a still further object of the invention to provide a novel valve of the plate valve type having a minimum of parts susceptible of wear and with machined mating surfaces whereby an effective seal can be gained without any distortion thereof.

It is a still further object of the present invention to provide a novel valve of the class set forth which may be readily installed, or replaced for whatever reason, and which may be manufactured with particular economy.

Further objects and advantages of the present invention will be readily apparent from the following specification, taken in conjunction with the accompanying drawings, wherein.

Figure 1:
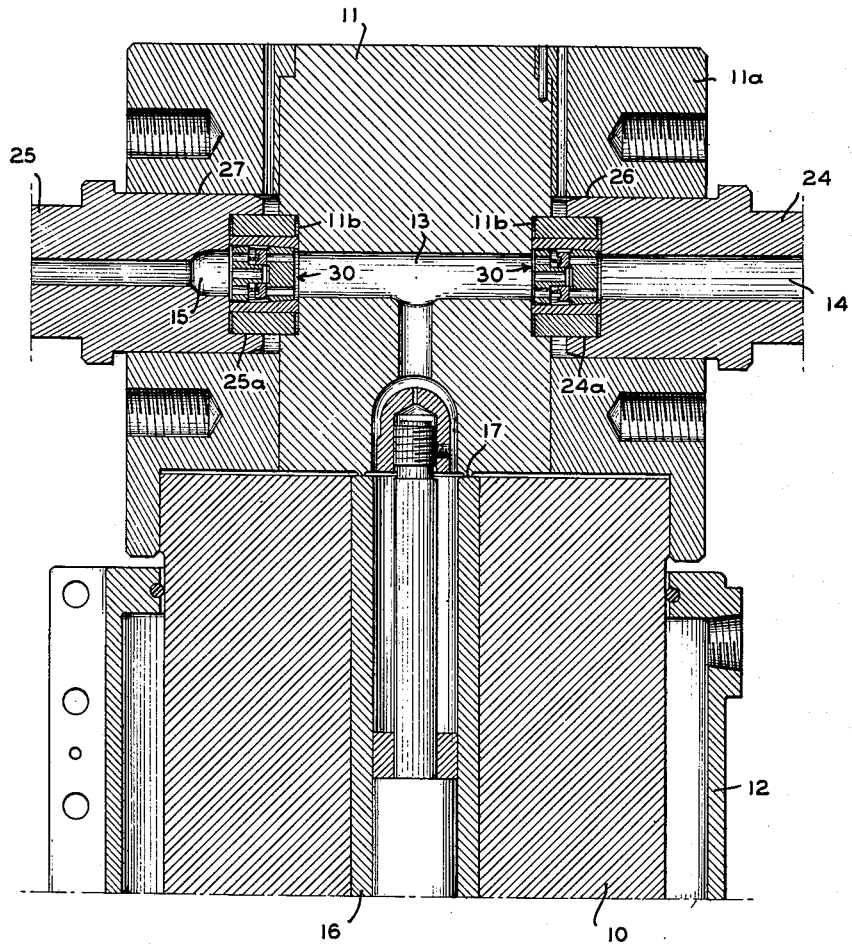
FIGURE 1 is a fragmentary sectional view through the head assembly of a compressor cylinder illustrating a pair of balanced valves constructed in accordance with the present invention and positioned in the opposed suction and discharge passages.

As shown in the drawings, particular reference being had to FIGURE 1 thereof, there has been illustrated, somewhat diagrammatically, a compressor cylinder 10 and head 11. Desirably, the cylinder is surrounded by a cooling jacket 12, as is well known in this art, and the head is provided with a compression chamber 13 of T-shaped configuration communicating with the inlet or suction passage 14 and the outlet or discharge passage 15. A cylinder liner 16 may be provided and the upper surface of this liner is highly machined for abutting engagement with a raised face seal 17, also having a highly machined surface, formed integrally with the cylinder head and depending therefrom. With engagement between highly lapped and polished surfaces of the character contemplated, an effective high-pressure seal is obtained between the cylinder liner and the cylinder head. Such a seal, or joint, is not expected to breathe, will eliminate stress concentration on the inner cylinder and, consequently, will minimize fatigue.

To provide for ease of assembly, and simplicity of manufacture and replacement of parts, the suction and discharge passages are formed within cylindrical bodies 24 and 25 secured within bores 26 and 27 provided in the tubular peripheral wall 11a of the cylinder head 11. The bodies, or plugs, 24 and 25 are provided with centrally located recesses 24a and 25a, respectively, on the inner extremities thereof, each of said recesses providing a seat for the reception of a novel valve indicated generally at 30 and constructed in accordance with the present invention. The central portion of the cylinder head which, in accordance with accepted practices, may be constructed separately from the peripheral wall thereof for purposes of convenient replacement, is provided on its outer surface with a pair of diametrically opposed recesses 11b located in surrounding relationship with respect to the extremities of the compression chamber 13 and in axial alignment therewith. Each recess 11b, it will be noted, is complementary to the associated recess in the adjacent body 24 or 25 and receives therein the end of the valve 30 opposite to that which is seated within said body.

It will be understood that the compression cylinder illustrated and described hereabove should be viewed as for illustrative purposes only and that the novel valve of the present invention may be utilized with equal facility in other types of compressors, pumps, or the like.

Figure 2:
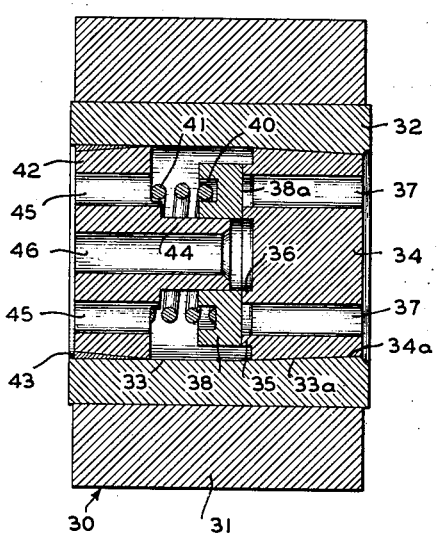
FIGURE 2 is a vertical sectional view, on an enlarged scale, taken through the valve illustrated in FIGURE 1.
Figure 4:
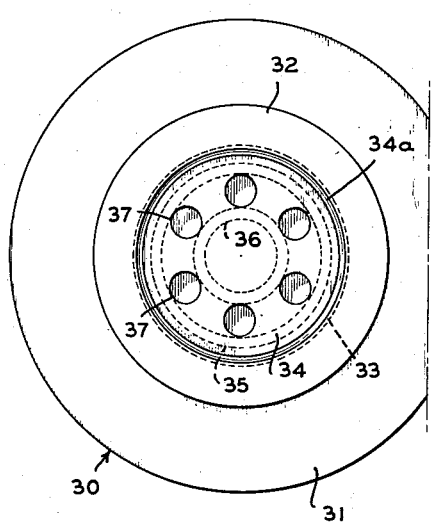
FIGURE 4 is a fragmentary end elevational view of the valve illustrating the inlet face thereof.
Figure 3:
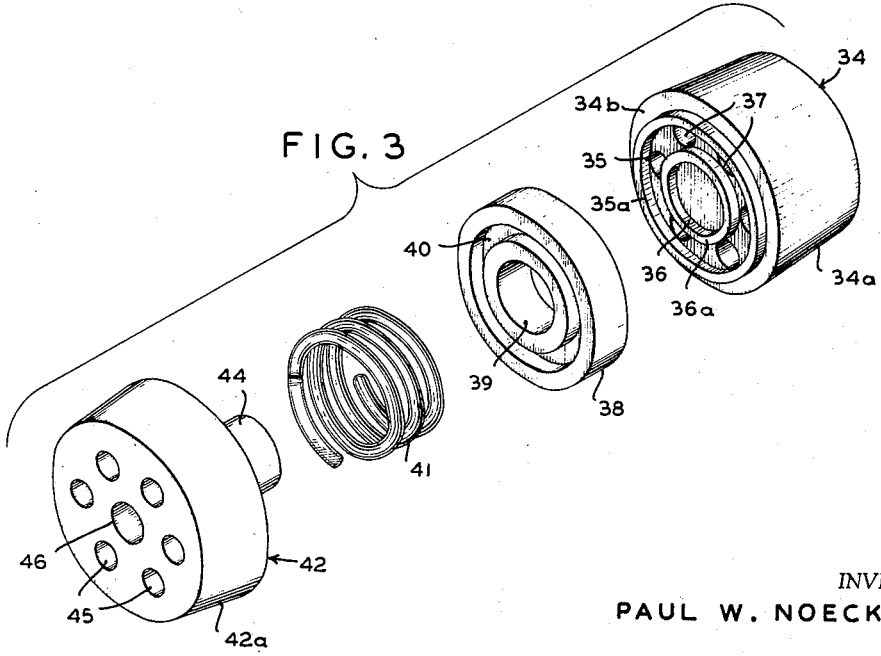
FIGURE 3 is an exploded perspective view of the valve plate guide stop, the compression spring, the valve plate and the valve seat body of the novel valve of the present invention.

Turning now to the valve 30 per se, this includes a minimum number of parts which are susceptible of convenient assembly and installation without requirement for skilled labor in connection therewith. As shown more particularly in FIGURES 2 and 3 of the drawings, an outer valve body or retaining sleeve 31 may be provided within which the inner valve body 32 is snugly received and retained by reason of a high interference fit. The inner valve body is provided with a centrally located bore 33 which includes a tapered portion 33a extending from a point adjacent the mid-portion toward the inlet extremity of the valve, whereby such inlet is of slightly reduced diameter, for a purpose to be described more fully hereafter.

A valve seat body 34 is provided, desirably of cylindrical configuration, having a tapered peripheral wall 34a the taper of which is complementary to that of the tapered portion 33a of the bore provided in the valve body 32. Thus a snug fit is provided between the valve seat and the valve body insuring proper installation, depending only upon the accuracy of the machined and mating surfaces, and the seat cannot be forced through the valve body, against the constriction of the tapered surfaces, whether by undue pressure or otherwise. It has been found in practice that a taper on the order of 3° provides optimum conditions of service.

The outlet face 34b of the valve seat body, this being the extremity of greater diameter, is provided with a pair of concentric annular ribs or flanges 35 and 36, comprising sealing rings, the faces 35a and 36a thereof desirably being highly lapped or polished. An annular depression or groove is thus created between the concentric flanges and the valve seat is provided with a plurality of longitudinally disposed passages or bores 37 arranged in uniformly spaced relationship and in a circular pattern defined by said groove. These passages extend through the valve seat 34, from end to end, and are in unobstructed alignment with the suction passage 14 as is clearly shown in FIGURE 1 of the drawing.

The valve plate 38 is of lesser diameter than the valve seat 34 and is of ring-like configuration, being provided with a centrally located bore 39. This bore is of a diameter approximating or preferably less than that of the inner annular flange 36 of the valve seat and thus the sealing face 38a of the valve plate 38 is of sufficient area to engage the lapped surfaces 35a and 36a of the valve seat. It will be understood that the sealing face or surface 38a of the plate valve also is highly lapped for appropriate engagement with the lapped surfaces of the annular flanges 35 and 36 of the valve seat whereby an effective seal can be maintained, when the valve is closed and under pressure, under operative cyclic pressures on the order of 35,000 p.s.i. to 50,000 p.s.i. and higher. The opposite face of the valve plate is provided with an annular groove 40 for the reception of one extremity of a compression spring 41 whereby the valve plate normally will be urged into sealing position closing the passages 37 in the valve seat body 34.

The valve plate guide and stop 42 is of cylindrical configuration and is provided with a tapered peripheral surface 42a. Desirably the taper of this surface is on the order of 3° and is opposite to that of the valve seat and a collet or the like 43 may be employed to retain the guide-stop in adjusted position within the bore 33 of the inner valve body 32 at a point remote from the valve seat 34.

A cylindrical boss 44 of reduced diameter projects inwardly from the valve plate guide-stop and the exterior diameter of this boss is such as to provide a sliding guide with the central bore 39 of the valve plate. In assembled relationship, the compression spring 41 surrounds the boss 44 and one extremity of said spring seats within the annular groove 40 of the valve plate and the other extremity abuts against the opposed inner face of the valve plate guide-stop thereby urging the valve plate into closed position.

The valve plate guide and stop is provided with a plurality of longitudinally disposed passages or bores 45 desirably arranged in uniformly spaced relationship and in a circular pattern, these bores being complementary to the bores 37 in the valve seat. It will be noted that the bores or passages 45 extend through the valve plate-guide stop, from end to end, and are in unobstructed alignment with the compression chamber when the valve is installed in operative position. Additionally, the valve plate guide-stop may be provided with a centrally located bore or passage 46.

In the operative structure, or compressor, illustrated, a pair of identical valves 30 constructed in accordance with the present invention are positioned so as to control suction and discharge passages at opposed extremities of the compression chamber. On the down stroke of the piston, a measured quantity of fluid (ethylene gas in the embodiment suggested) will be drawn through the right hand valve 30 and into the compression chamber 13. With the creation of suction within the compression chamber, coincident with the piston down stroke, the valve plate 34 (of the right hand valve 30) will be opened against the normal pressure of the compression spring 41, it being understood that the left hand valve 30 cannot open or be influenced adversely by reason of the suction created. With the one valve open, fluid will be drawn through the ports 37 in the valve seat 34 and will flow around the valve plate and through the ports 45 in the valve plate guide-stop 42 and also through the central bore 46 and pass directly into the compression chamber 13. Under suggested normal operating conditions suction of possibly 2,000 or more pounds pressure may be created, this being more than sufficient to overcome the pressure exerted by the compression spring 41 in biasing the valve plate to closed position.

On the compression stroke, where pressure on the order of 35,000 p.s.i. and greater is developed within the compression chamber, the right hand valve is immediately closed by such pressure and the fluid under pressure is forced through the left hand valve 30 which functions in identical manner to that described hereabove.

The extremely short valve plate lift, together with the improved distribution of the plate mass minimizes the possibility of wear upon the valve seat. The lapped sealing surfaces provide an effective seal without any possibility of distortion of such surfaces and the taper of the peripheral surfaces of the valve seat and valve guide stop (such tapers desirably being on the order of 3°) prevent any possibility of displacement of parts and also assist in offsetting cyclic stresses produced in the valve by compression. In practice, compressors equipped with valves as described herein have functioned with complete efficiency over protracted periods of time, at pressures on the order of 50,000 p.s.i. without being affected by metal fatigue failures induced by cyclic stresses or otherwise.

With a valve constructed as described hereabove, the valve housing comprising inner and outer concentric bodies assembled with a high interference fit, a structure is obtained wherein the inner of said concentric bodies is provided with a superimposed compressive stress which is not affected by cyclic stresses induced by gas compressing within super pressure ranges. The high tensile stress superimposed upon the outer of said concentric bodies is such that it, also, is not affected by cyclic stresses due to compressing. Further, the absence of stress risers, such as drilled holes, abrupt changes in section, or the like, minimize any possibilities of initiation points for failure by fatigue.

Since the valve seat body is provided with a tapered peripheral surface, fitting into the complementarily tapered portion of the bore of the inner valve body, it also is subjected to a high superimposed compressive stress through a high interference fit when the valve seat body is forced into position. Additionally, this superimposed compressive strength upon the valve seat body is of such a value that it cannot be overcome by cyclic stresses induced by compression whereby failure may result.

There has thus been described a novel valve of the plate type which will function with maximum efficiency under varying conditions ranging from low to extremely high pressures. Further, the present valve may be manufactured with extreme economy and may be installed and/or replaced with a minimum of effort.

It will be understood by those skilled in this art that the invention may be embodied in various forms in addition to those specifically illustrated and therefore the invention is not considered limited by that which has been shown in the drawings and described in the specification but only as indicated in the appended claims.

What is claimed is:

1. A high pressure valve comprising an annular housing having a bore extending therethrough, said bore including a tapered portion adjacent one extremity thereof providing an inlet of slightly reduced diameter, a complementarily tapered valve seat body seated within the tapered portion of said bore, a sealing ring extending outwardly from the outlet face of said valve seat body, said valve seat body being provided with a plurality of inlet passages extending therethrough, said passages being disposed in a circular pattern within the confines of said sealing ring, an oppositely tapered valve plate stop mounted within said bore at a point remote from said valve seat body, complementarily tapered locking means for retaining said valve plate stop in adjusted position, a substantially centrally located valve plate guide projecting from the inner face of said valve plate stop, a valve plate mounted upon said valve plate guide for sliding movement, said valve plate having a sealing face of sufficient diameter to engage with the sealing ring on the valve seat body and close the inlet passages extending therethrough, said valve plate stop being provided with a plurality of outlet passages extending therethrough, said passages being disposed in a circular pattern surrounding said valve plate guide, said valve plate stop also being provided with a centrally located outlet passage extending therethrough and spring means for normally urging said valve plate into closed position.

2. A high pressure valve as set forth in claim 1 where the taper of the periphery of the valve seat body is on the order of 3°.

3. A high pressure valve comprising an annular housing having a bore extending therethrough, said bore including a tapered portion adjacent one extremity thereof providing an inlet of slightly reduced diameter, a complementarily tapered valve seat body seated within the tapered portion of said bore, a sealing ring extending outwardly from the outlet face of said valve seat body, said valve seat body being provided with an inlet passage extending therethrough and located within said sealing ring, an oppositely tapered valve plate stop mounted within said bore at a point remote from said valve seat body, complementarily tapered locking means for retaining said valve plate stop in adjusted position, a substantially centrally located valve plate guide projecting from the inner face of said valve stop, said valve plate stop being provided with an outlet passage extending therethrough, a valve plate mounted upon said valve plate guide for sliding movement, said valve plate having a sealing face of sufficient diameter to engage with the sealing ring on the valve seat body and close the inlet passage in said body, and spring means normally urging said valve plate into closed position.

4. A high pressure valve comprising an annular housing consisting of inner and outer concentric bodies assembled with a high interference fit to afford a superimposed compressive stress upon the inner body, a bore extending through said inner body, said bore including a tapered portion adjacent one extremity thereof providing an inlet of slightly reduced diameter, a complementarily tapered valve seat body seated within said tapered portion and retained therein by a high interference fit whereby said valve body is subjected to a high superimposed compressive stress, a plurality of inlet passages extending through said valve seat body, an oppositely tapered valve plate stop mounted within said bore at a point remote from said valve seat body, complementarily tapered locking means for retaining said valve plate stop in adjusted position, a substantially centrally located valve plate guide extending from the inner face of said valve plate stop, said valve plate stop being provided with a plurality of outlet passages extending therethrough, a valve plate mounted upon said valve plate guide for sliding movement, said valve plate having a sealing surface of sufficient diameter to close the inlet passages in said valve seat body, and spring means normally urging said valve plate into closed position.

5. A high pressure valve comprising an annular housing having a bore extending therethrough, said bore including a tapered portion adjacent one extremity thereof providing an inlet of slightly reduced diameter, a complementarily tapered valve seat body seated within the tapered portion of said bore, the outer face of said valve seat body being provided with a pair of concentric sealing rings extending outwardly therefrom, said valve seat body being provided with a plurality of spaced inlet passages disposed in a circular pattern located between said sealing rings, an oppositely tapered valve plate stop positioned within said bore adjacent the outlet extremity thereof at a point remote from said valve seat body, complementarily tapered means for securely retaining said valve plate stop in position, an axially located boss of reduced diameter projecting from the inner face of said valve stop and providing a valve plate guide, said valve plate stop being provided with a plurality of outlet passages extending therethrough and centrally located passage disposed in a circular pattern complementary to that of the inlet passages of the valve seat, an annular valve plate mounted upon said valve guide for sliding movement, said valve plate having a sealing face of sufficient diameter to engage with the concentric sealing rings on the valve seat body and close the inlet passages in said body, the opposite face of said valve plate being provided with an annular groove, and a coil spring surrounding said valve guide and normally urging said valve plate into closed position, one extremity of the coil spring being seated within said annular groove while the opposed extremity of said coil spring engages the adjacent face of the valve plate stop.

6. In a compressor including a cylinder, a piston reciprocable therein, and a cylinder head, said cylinder head being provided with a compression chamber communicating with suction and discharge passages, the improvement which comprises a pair of identical high pressure plate valves, one of said valves controlling flow from the suction passage to the compression chamber of fluid to be compressed, the other of said valves controlling passage of compressed fluid through the discharge passage, each of said valves comprising a housing having a bore extending therethrough, said bore including a tapered portion adjacent one extremity thereof providing an inlet of slightly reduced diameter, a complementarily tapered valve seat body seated within the tapered portion of said bore, a sealing ring extending outwardly from the outlet face of said valve seat body, said valve seat body being provided with a plurality of inlet passages extending therethrough, said passages being disposed in a circular pattern within the confines of said sealing ring, an oppositely tapered valve plate stop mounted within said bore at a point remote from said valve seat body, complementarily tapered locking means for retaining said valve plate stop in adjusted position, a valve plate guide projecting from the inner face of said valve plate stop, a valve plate mounted upon said valve plate guide for sliding movement, said valve plate having a sealing face of sufficient diameter to engage with the sealing ring on the valve seat body and close the inlet passages extending therethrough, said valve plate stop being provided with a plurality of outlet passages extending therethrough, said passages being disposed in a circular pattern surrounding said valve plate guide, and spring means for normally urging said valve plate into closed position.

7. A compressor as set forth in claim 6 wherein the taper of the peripheral surfaces of the valve seat bodies and valve plate stops is on the order of 3°.

References Cited in the file of this patent

UNITED STATES PATENTS

| 556,024 | Pew | Mar. 10, 1896 |
| 2,304,991 | Foster | Dec. 15, 1942 |
| 2,506,306 | Mantle | May 2, 1950 |

FOREIGN PATENTS

| 810,827 | Germany | Aug. 13, 1951 |